United States Patent
Cheng et al.

(10) Patent No.: US 8,248,022 B2
(45) Date of Patent: Aug. 21, 2012

(54) ELECTRONIC DEVICE HAVING ENERGY RECYCLING SYSTEM

(75) Inventors: Hao-Der Cheng, Taipei Hsien (TW); Hung-Chou Chan, Taipei Hsien (TW); Hung-Chin Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 304 days.

(21) Appl. No.: 12/784,513

(22) Filed: May 21, 2010

(65) Prior Publication Data

US 2011/0193514 A1     Aug. 11, 2011

(30) Foreign Application Priority Data

Feb. 5, 2010   (CN) .......................... 2010 1 0301265

(51) Int. Cl.
    *H01M 10/44*     (2006.01)
    *G06F 1/20*     (2006.01)
(52) U.S. Cl. ................................... 320/101; 361/679.31
(58) Field of Classification Search .................. 320/101; 361/679.48, 679.5

See application file for complete search history.

(56) References Cited

U.S. PATENT DOCUMENTS

| | | | | |
|---|---|---|---|---|
| 6,661,651 | B1* | 12/2003 | Tanzer et al. | 361/679.33 |
| 2009/0303678 | A1* | 12/2009 | Ishimine et al. | 361/679.48 |
| 2011/0132579 | A1* | 6/2011 | Best et al. | 165/104.31 |

* cited by examiner

*Primary Examiner* — M'Baye Diao
(74) *Attorney, Agent, or Firm* — Altis Law Group, Inc.

(57) ABSTRACT

An electronic device includes a computer server and an energy recycling system. The computer server includes a frame, at least one fan, and a heat source both are received in the frame. The frame includes a first sidewall with a plurality of vents formed thereon. The fan defines an air inlet facing the heat source, and an air outlet facing the first sidewall and substantially aligned with the vents. The energy recycling system includes a rotation assembly and an electric generator. The rotation assembly includes a rotation shaft and a plurality of driven members formed on the rotation shaft. The rotation assembly is arranged in front of the first sidewall. The driven members are driven by the airflow to rotate the rotation shaft. The rotation shaft is connected to the electric generator configured for converting the rotation of the rotation shaft into electrical energy.

15 Claims, 1 Drawing Sheet

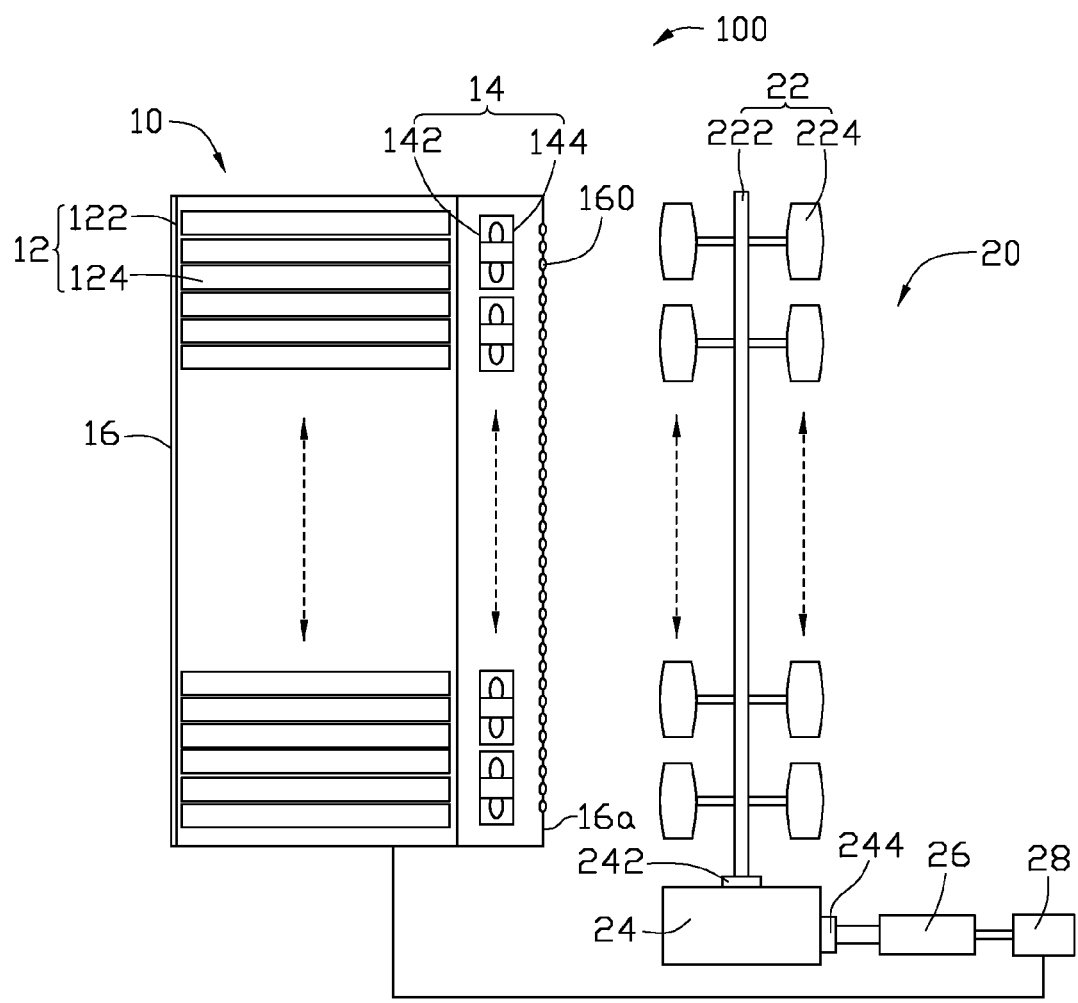

ELECTRONIC DEVICE HAVING ENERGY RECYCLING SYSTEM

BACKGROUND

1. Technical Field

The present disclosure relates to electronic devices and, particularly, to an electronic device having an energy recycling system.

2. Description of Related Art

Most of electronic devices generate undesired heat when working. The heat is usually dissipated directly without recycling, leading to lower energy efficiency of the electronic devices.

Therefore, it is desirable to provide an electronic device having an energy recycling system, which can overcome the above-mentioned problems.

BRIEF DESCRIPTION OF THE DRAWING

Many aspects of the present electronic device having an energy recycling system can be better understood with reference to the accompanying drawings. The components in the drawings are not necessarily drawn to scale, the emphasis instead being placed upon clearly illustrating the principles of the present electronic device having an energy recycling system. Moreover, in the drawings, like reference numerals designate corresponding parts throughout the several views, and all the views are schematic.

The drawing is a schematic view of an electronic device having an energy recycling system according to an exemplary embodiment.

DETAILED DESCRIPTION

Embodiments of the present electronic device having an energy recycling system will now be described in detail below and with reference to the drawing.

Referring to the drawing, an electronic device 100 according to an exemplary embodiment, includes a computer server 10, and an energy recycling system 20 for recycling heat energy generated by the computer server 10.

The computer server 10 includes a heat source 12 (e.g., electronic elements of the computer server 10), at least one fan 14, and a frame 16. The frame 16 is hollow cuboid in shape and includes a first sidewall 16a. The heat source 12 and the at least one fan 14 are received in the frame 16. The first sidewall 16a defines a plurality of vents 160 therein. The heat source 12 includes a framework 122 and a plurality of stacked servo boards (i.e., printed circuit boards) 124 framed by the framework 122. In the present embodiment, each of the at least one fan 14 is a turbo fan, and defines an air inlet 142 facing the servo boards 124 and an air outlet 144 facing the first sidewall 16a and substantially aligned with the vents 160. As such, airflow produced by the at least one fan 14 can pass through the vents 160 with an extremely low air resistance.

The energy recycling system 20 includes a rotation assembly 22, a gearbox 24, an electric generator 26, and a rechargeable battery 28. In the present embodiment, the rotation assembly 22 is made of high temperature resisting materials. The rotation assembly 22 arranges in front of the first sidewall 16a of the frame 16 but is spaced with a predetermined distance therebetween. The rotation assembly 22 includes a rotation shaft 222 disposed substantially perpendicular to the direction of the airflow produced by the at least one fan 14. The rotation assembly 22 further includes a plurality of driven members 224 integrally formed with the rotation shaft 222.

The gearbox 24 includes an input shaft 242 and an output shaft 244 formed perpendicular to the input shaft 242. The output shaft 244 rotates at a higher rate than that of the input shaft 242. The rotation shaft 222 of the rotation assembly 22 is coupled to the input shaft 242. The output shaft 244 is coupled to the electric generator 26. The electric generator 26 is configured for converting mechanical energy generated by the gearbox 24 to electrical energy. The rechargeable battery 28 is electrically coupled to the electric generator 26, and is configured for storing electrical energy generated by the electric generator 26. In the present embodiment, the rechargeable battery 28 is also electrically coupled to the computer server 10 for providing power supply to the computer server 10.

It is noteworthy that, in alternative embodiments, the gearbox 24 can be also omitted, and the rotation shaft 222 of the rotation assembly 22 can be coupled to the electric generator 26 directly.

In use, the at least one fan 14 blows heat generated by the heat source 20 out of the frame 16 via the vents 160 of the first sidewall 16a. The hot airflow flows out of the frame 16 via the vents 160 to drive the driven members 224 and the rotation shaft 222 of the rotation assembly 22 to synchronously rotate, thereby the electric generator 26 converts mechanical energy generated by the hot airflow to electrical energy. As such, heat generated by the computer server 10 is recycled.

It will be understood that the above particular embodiments and methods are shown and described by way of illustration only. The principles and the features of the present disclosure may be employed in various and numerous embodiments thereof without departing from the scope of the present disclosure as claimed.

What is claimed is:

1. An electronic device, comprising:
    a computer server comprising:
        a frame comprising a first sidewall with a plurality of vents formed therein; and
        at least one fan and a heat source both received in the frame, each of the at least fan defining an air inlet facing the heat source, and an air outlet facing the first sidewall and substantially aligned with the vents, airflow produced by the at least one fan passing through the vents; and
    an energy recycling system comprising:
        a rotation assembly arranged in front of the first sidewall of the frame but spaced with a predetermined distance therebetween, the rotation assembly comprising a rotation shaft disposed substantially perpendicular to the direction of the airflow produced by the at least one fan, and a plurality of driven members formed on the rotation shaft, the plurality of driven members driven by the airflow to rotate the rotation shaft; and
        an electric generator coupled to the rotation shaft for converting the rotation of the rotation shaft into electrical energy.

2. The electronic device of claim 1, wherein the heat source comprises a framework and a plurality of stacked servo boards framed by the framework.

3. The electronic device of claim 1, wherein each of the at least one fan is a turbo fan.

4. The electronic device of claim 1, further comprising a rechargeable battery, wherein the rechargeable battery is electrically coupled to the electric generator and is configured for storing electrical energy generated by the electric generator.

5. The electronic device of claim 4, wherein the rechargeable battery is electrically coupled to the computer server for providing power supply to the computer server.

6. The electronic device of claim 1, wherein the rotation assembly is made of a high temperature resisting material.

7. The electronic device of claim 1, wherein the plurality of driven members are integrally formed with the rotation shaft.

8. An electronic device comprising:
   a computer server comprising:
      a frame comprising a first sidewall with a plurality of vents formed therein; and
      at least one fan and a heat source both received in the frame, each of the at least fan defining an air inlet facing the heat source, and an air outlet facing the first sidewall and substantially aligned with the vents, airflow produced by the at least one fan passing through the vents; and
   an energy recycling system comprising:
      a rotation assembly arranged in front of the first sidewall of the frame but spaced with a predetermined distance therebetween, the rotation assembly comprising a rotation shaft disposed substantially perpendicular to the direction of the airflow produced by the at least one fan, and a plurality of driven members formed on the rotation shaft, the plurality of driven members driven by the airflow to rotate the rotation shaft;
      an electric generator coupled to the rotation shaft for converting the rotation of the rotation shaft into electrical energy; and
      a gearbox comprising an input shaft and an output shaft, the rotation shaft of the rotation coupled to the input shaft, the output shaft coupled to the electric generator.

9. The electronic device of claim 8, wherein the heat source comprises a framework and a plurality of stacked servo boards framed by the framework.

10. The electronic device of claim 8, wherein each of the at least one fan is a turbo fan.

11. The electronic device claim 8, further comprising a rechargeable battery, wherein the rechargeable battery is electrically coupled to the electric generator and is configured for storing electrical energy generated by the electric generator.

12. The electronic device of claim 11, wherein the rechargeable battery is electrically coupled to the computer server for providing power supply to the computer server.

13. The electronic device of claim 8, wherein the rotation assembly is made of a high temperature resisting material.

14. The electronic device of claim 8, wherein the output shaft rotates at higher rate than the input shaft.

15. The electronic device of claim 8, wherein the plurality of driven members are integrally formed with the rotation shaft.

\* \* \* \* \*